United States Patent [19]

Sturtevant

[11] 3,964,148

[45] June 22, 1976

[54] CONDENSER LUG EXTRACTOR

[76] Inventor: Rodney Lee Sturtevant, 16 Broughton, Tonawanda, N.Y. 14150

[22] Filed: Jan. 13, 1975

[21] Appl. No.: 540,528

[52] U.S. Cl. .............................. 29/203 H; 81/5.1 R; 81/418
[51] Int. Cl.² ............................................. B25B 7/00
[58] Field of Search .................... 81/418, 309, 51 R; 29/203 H, 200 H

[56] References Cited
UNITED STATES PATENTS

| | | | |
|---|---|---|---|
| 2,824,473 | 2/1958 | Smith | 81/309 X |
| 3,050,841 | 8/1962 | Esselstyn | 29/203 H |
| 3,757,406 | 9/1973 | Bezar | 81/5.1 R |

Primary Examiner—James L. Jones, Jr.
Attorney, Agent, or Firm—Raymond F. Kramer

[57] ABSTRACT

An extracting tool for removing a lug from an electronic part includes a pair of handle members, a gripping member and a ram, with the handle members being so related to the gripping member that on squeezing of the handles, jaws of the gripping member and of one of the handle members grip the lug of a condenser and on further squeezing of the handles a lever joined to the other of the handles moves the ram, which is mounted adjacent to one of the jaws, against the condenser, thereby causing relative motion of the condenser and the lug and extracting the lug from the condenser. Also described is a method for replacing an electrolytic can type condenser by detaching the lugs therefrom without detaching the electrical connections to the lugs and then soldering the lugs of a replacement condenser to said connected lugs.

6 Claims, 6 Drawing Figures

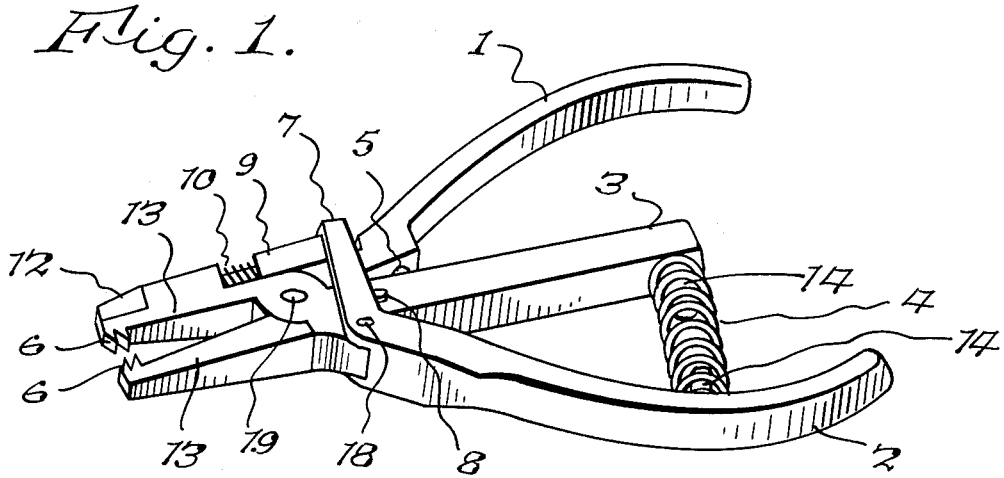
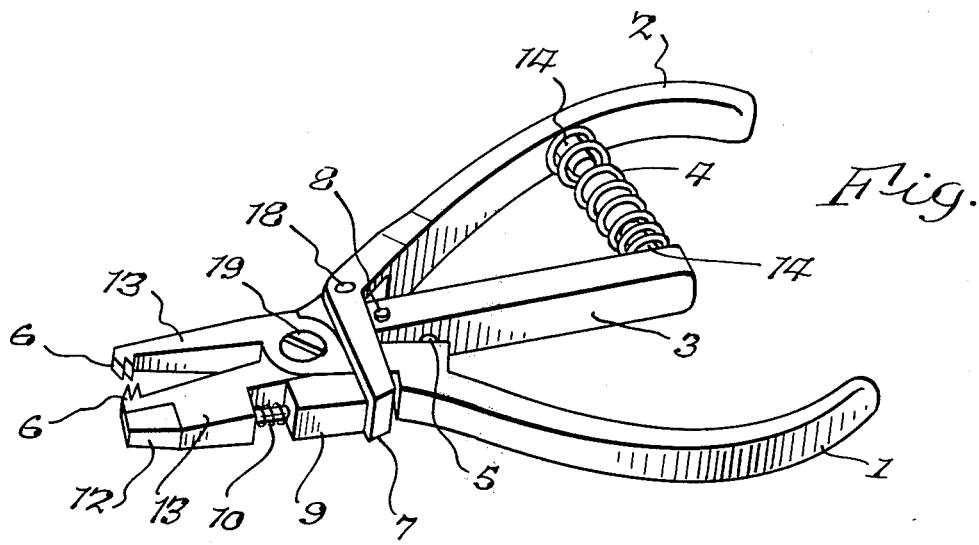
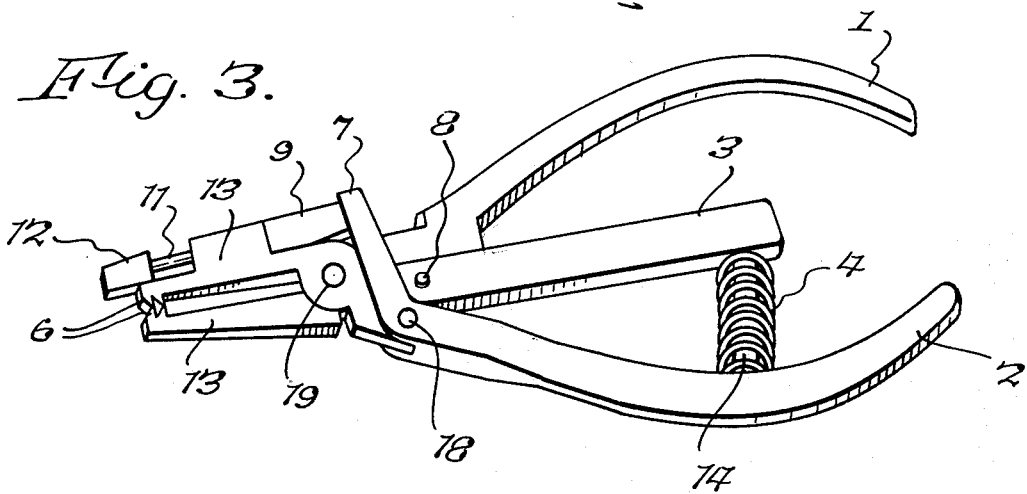

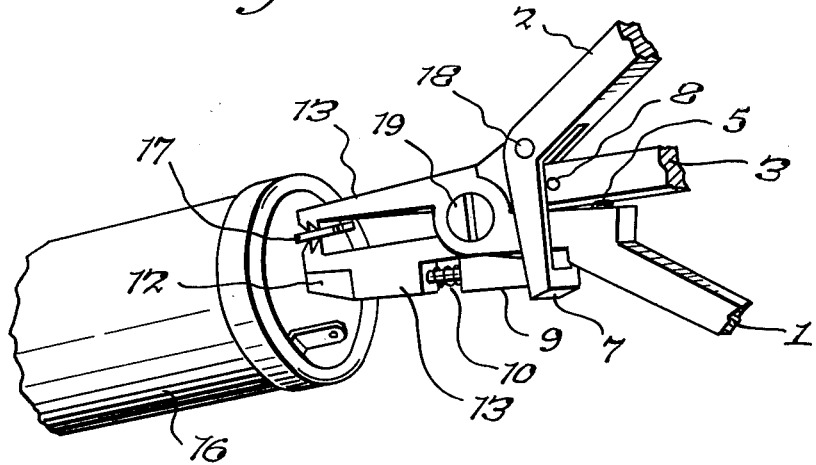
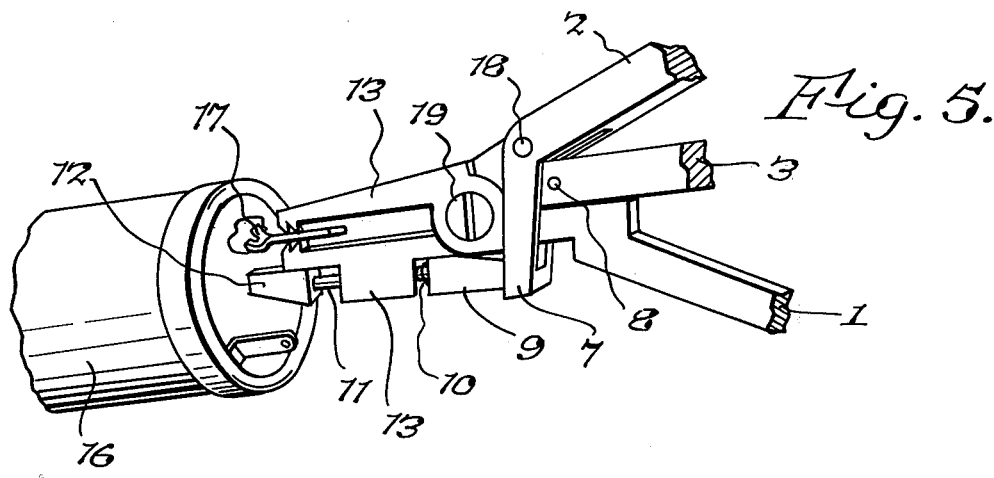
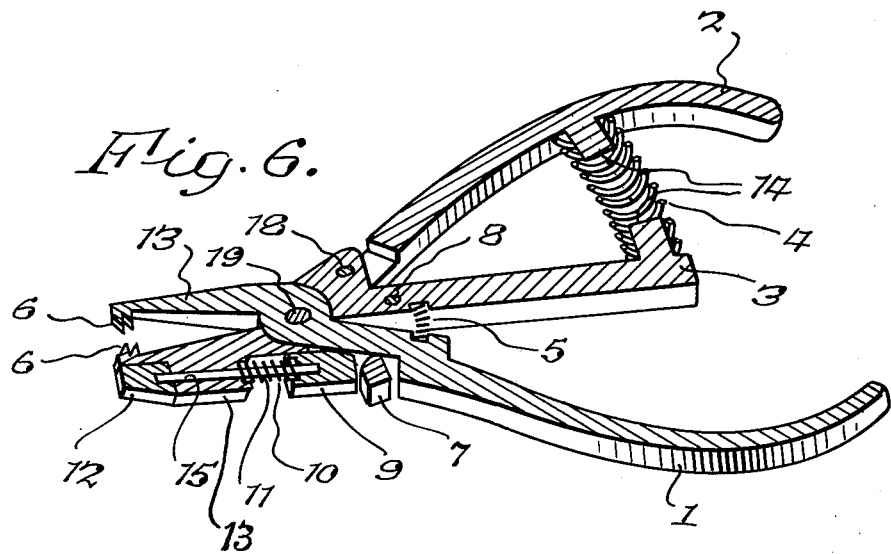

CONDENSER LUG EXTRACTOR

This invention relates to a tool for use in work in the electronics field. More particularly, the invention is of a condenser lug extractor and of a method in which it may be employed.

In accordance with the present invention an extracting tool for removing a lug from an electronic part comprises a pair of handle members, one of which, the gripping handle member, has a handle portion at one end thereof and a gripping jaw portion at the other end thereof and the other of which, the ram actuating handle member, has a handle portion at one end thereof and includes means for actuating a ram, a gripping member having a gripping jaw portion at one end thereof, means for transmitting force between the gripping member and the handle portion of the ram actuating handle member and a ram positioned adjacent to one of the jaws and adapted to be moved substantially transversely to the direction of jaw movement of the ram actuating means as the handles are squeezed to be moved closer together after gripping of the lug, so that when the handles are squeezed together the jaws of the gripping member and the gripping handle member are brought together to grip the lug of the electronic part and the ram presses against the electronic part to pull the lug therefrom. Also within the invention is a method of replacing a condenser of the electrolytic can type, having lugs at an end thereof connected to other electronic components, which comprises removing the lugs from the condenser without removing such other components from electrical communication with the lugs, replacing the condenser with a new condenser having lugs thereon and electrically connecting said lugs on the new condenser with the components by joining said lugs to the lugs removed from the replaced condenser.

By means of the present invention an electronic technician may remove from an electronic part the solder lugs thereon, which are the lugs onto which electric connections to other circuit elements in an electronic apparatus may be soldered, and can do this without having to unsolder the wires or other components which are connected to such lugs. In other words, the technician does not have to melt the solder on the lugs and remove the wires connected to the lugs so that he then can solder these onto a new electronic part. He merely uses the present tool and extracts or disengages the lugs from the old electronic part, such as an electrolytic can type condenser, without unsoldering the connections to such lugs. Then, the extracted lugs can be soldered onto the corresponding lugs of a new condenser after installation of the new condenser. This eliminates the necessity for removing components from the old condenser and saves the time and effort (and prevents possible mistakes in misjoining leads) that would be involved in the lengthier operations effected without the present tool.

The invention will be more readily understood by reference to the description thereof in the specification and to the drawing in which:

FIG. 1 is a perspective view of the condenser lug extracting tool of the present invention in relaxed, open position, with the ram of the tool being shown at an upper portion thereof;

FIG. 2 is a perspective view of the opposite side of the tool of FIG. 1, showing the ram at a lower portion thereof;

FIG. 3 is a perspective view, corresponding essentially to FIG. 1, with the extracting tool being shown in applied or extracting position, FIG. 4 is a partial perspective view of the jaw end of the tool in substantially relaxed position, like that of FIG. 2, with the jaws thereof about a lug of an electrolytic can type condenser;

FIG. 5 is a partial perspective view of the same tool in the same relative position with respect to the condenser as shown in FIG. 4 but in extracting position with the ram pressing against the condenser and with the lug extracted from the condenser; and FIG. 6 is a longitudinal sectional view of the tool in the position shown in FIG. 2.

In FIGS. 1, 2, 4 and 6 the condenser lug extractor is shown in relaxed or comparatively relaxed position with a pressure spring 4 or means for transmitting force between a gripping member and a handle portion of a ram actuating handle member being shown holding the cam handle or ram actuating handle member 2 and the gripper bar or gripping member 3 apart and the cam lever, lever portion of the ram actuating handle member or ram actuating means 7 against a stop or cam lever stop pin 8 on a gripping member, keeping a load or pressure on spring 4. Ram return spring 10 is holding ram actuating anvil 9 back against cam lever 7 in such relaxed position. Jaw spring 5 is holding gripping handle member or gripper handle 1 and gripping member or gripper bar 3 apart, causing jaws 13 and teeth 6 thereon to be in open position. Ram rod or push rod 11, fastened to ram actuating anvil 9 and ram head or tip 12, travels back and forth in the opening in the gripping jaw portion of the gripping member, which is referred to as the ram rod guide passageway 15, so that head 12 moves forwardly toward the electronic article from which the lug is extracted when gripper handle 1 and cam handle 2 are brought together and, due to the force exerted, spring 4 is compressed and cam handle 2 and gripper bar 3 are brought together so that cam lever 7 is moved forwardly and thereby the ram, which includes tip 12, rod 11, and actuating block or anvil 9, is moved forward against the condenser. When pressure on the handles is relaxed, return spring 10 returns to position so that teeth 6, which are at the forward ends of jaws 13 and may grip the lug 17 to be removed at a location right next to the end of condenser 16, alongside lug 17, will relax their grip. Also, when gripping on the handles is relaxed jaw spring 5 opens handle 1 with respect to gripper 3 and pressure spring 4, held around stop sections or stop rods 14, joined respectively to cam handle 2 and gripper bar 3, opens the cam handle with respect to the gripper bar.

To utilize the present tool to extract lug 17 from condenser 16 the tool is placed in position with teeth 6 as near to the end of the condenser as possible and in position about lug 17 and then gripper handle 1 and cam handle 2 are squeezed together by a single hand action, whereby pressure is applied through pressure spring 4 to gripper bar 3. Jaw spring 5, smaller and weaker than pressure spring 4, is compressed between gripper handle 1 and gripper bar 3, letting gripper teeth 6 grip the condenser lug 17, which extends from the end of a cam type electrolytic condenser 16. Pressure spring 4, after allowing applying of sufficient force against jaw spring 5 to close the teeth about the lug, then, upon further compression, allows cam lever 7 to move from its relaxed position against cam lever stop pin 8 and thereby allows it to push ram anvil 9 and ramp tip 12 against the end of condenser 16 and as the ram is moved forward against the condenser the lug is extracted, so that when pressure spring guide stop rods 14 contact each other the lug has been removed from the condenser. It will be readily appreciated that shoulder bolt 19 serves as the pivot for gripper handle 1 and gripper bar 3 and pin 18 is a hinge pin between the cam lever handle and the gripper bar about which such handle passes.

The present lug extractor can be made of any suitable material of construction, such as 2A tool steel or the equivalent and may be produced by machining or casting.

The invention has been described with respect to illustrations of the tool and processes in which it may be employed but it is not to be limited to these because it is evident that one of skill in the art to which it pertains, with the present specification before him, will be able to utilize substitutes and equivalents without departing from the spirit or scope of the invention.

What is claimed is:

1. An extracting tool for removing a lug from an electronic part which comprises a pair of handle members, one of which, a gripping handle member, has a handle portion at one end thereof and a gripping jaw portion at the other end thereof and the other of which, a ram actuating handle member, has a handle portion at one end thereof and includes at the other end thereof means for actuating a ram, a gripping member separately pivotally connected to the handle members and having a gripping jaw portion at an end thereof, means for transmitting force between the gripping member and the handle portion of the ram actuating handle member and a ram positioned adjacent to one of the jaws to be moved substantially transversely to the direction of jaw movement of the ram actuating means as the handles are squeezed to be moved closer together after gripping of the lug, so that when the handles are squeezed together the jaws of the gripping member and the gripping handle member are brought together to grip the lug of the electronic part and the ram presses against the electronic part to pull the lug therefrom.

2. An extracting tool according to claim 1, suitable for removing from a condenser a lug to which other electronic components are attached, wherein the gripping handle member and gripping member are pivoted together, the ram actuating handle member and gripping member are pivoted together and the force transmitting means between the gripping handle and handle portion of the ram actuating handle member is a spring.

3. An extracting tool according to claim 1 wherein the ram is located alongside the gripping jaw portion of the gripping member, the ram actuating means is a lever portion of the ram actuating handle member at an end thereof opposite the handle end, the ram is maintained in normally retracted position by spring means, the jaws are maintained apart by spring means between the gripping handle member and the gripping member and the strength of the spring between the gripping member and the ram actuating handle member is greater than that of the spring between the gripping member and the gripping handle member so that when the handles are squeezed together the gripping jaws close on the lug, after which the ram is moved against the electronic part to remove the lug therefrom.

4. An extracting tool according to claim 3 wherein the jaws include teeth to grip the lug with sufficient force to hold it while the ram is pressed against the electronic part and moves with respect to the lug and the ram contacts the electronic part adjacent to the lug and to a side of it and the holding teeth.

5. An extracting tool according to claim 4 which includes a stop on the gripping member to limit the backward movement of the lever in a direction away from that in which the ram is pressed against the condenser and thereby also to limit the opening of the ram actuating handle member with respect to the gripping member, the ram is limited in backward motion by contact with the lever which is so limited and the opening of the gripping handle member with respect to the gripping member is limited by contact of said gripping handle member with the lever member, so that in relaxed position the extracting tool has the jaws thereof open with the ram in retracted position.

6. An extracting tool according to claim 5 wherein the ram includes a ram head, a ram rod and a ram anvil, with the ram rod being guided in its movement through an opening in the gripping member near the gripping jaw portion thereof, the gripping member has such an opening in the gripping jaw portion thereof and the lever portion of the ram actuating handle member encloses the gripping member and gripping handle member and has a connecting portion thereon which contacts the ram anvil to press the ram forward against the condenser as the tool handles are squeezed together.

* * * * *